Jan. 8, 1957   D. VAN DOUWE   2,776,747
COLOR SORTING MACHINE
Filed April 20, 1953
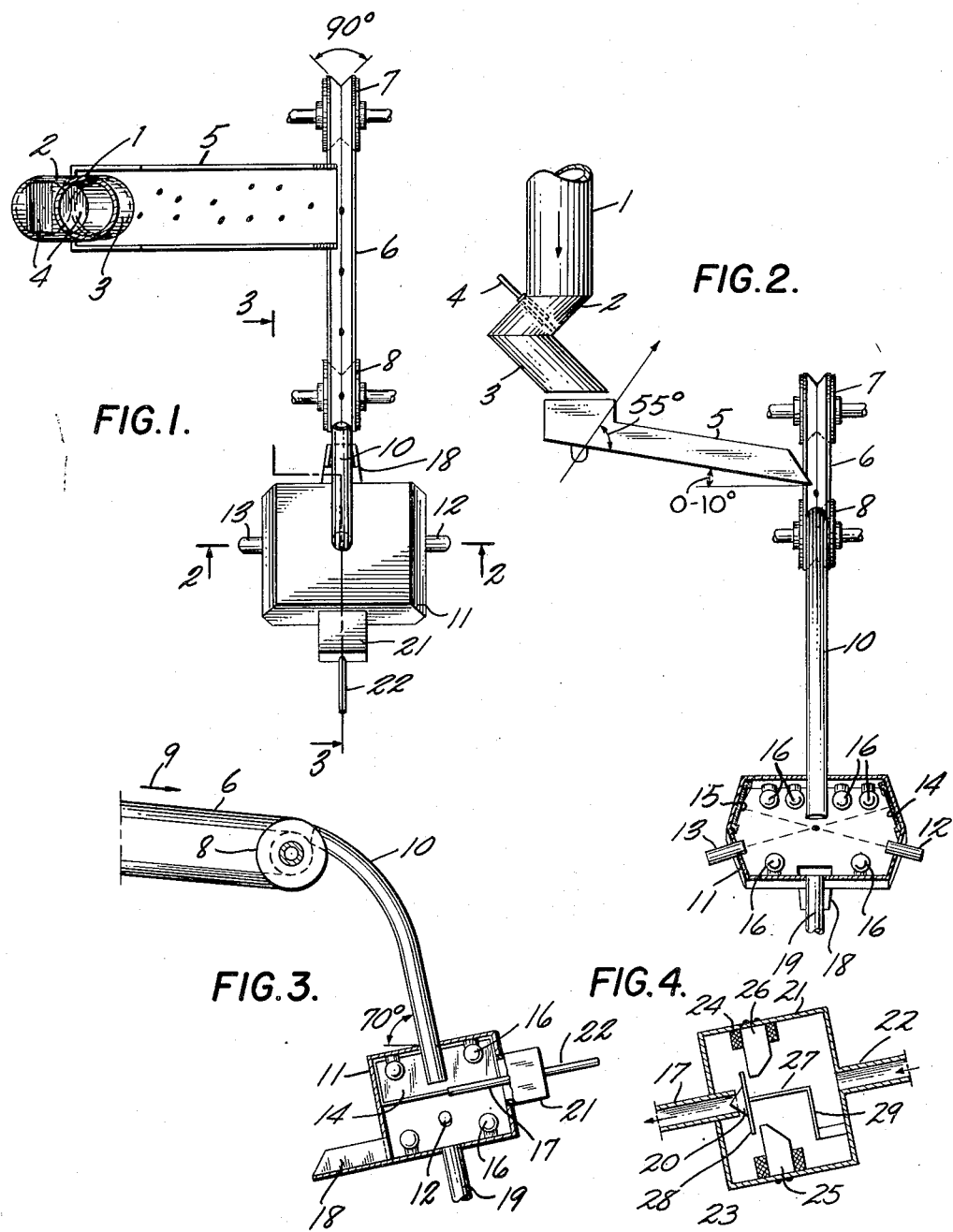

United States Patent Office 2,776,747
Patented Jan. 8, 1957

2,776,747

COLOR SORTING MACHINE

Dirk Van Douwe, Rotterdam, Netherlands, assignor to N. V. Maatschappij-Koffiepellerij Blaauwhoedenveem, Rotterdam, Netherlands, a company of the Netherlands Application April 20, 1953, Serial No. 349,840

Claims priority, application Netherlands April 19, 1952

7 Claims. (Cl. 209—111)

The invention relates to machines for sorting small objects, especially beans, peas and the like, according to their different colors with the aid of photo-electric cells.

Some of the objects of the present invention are: to provide an improved machine for sorting objects by color; to provide a sorting machine wherein the speed of sorting is materially increased without adversely affecting accurate sorting; to provide a machine for sorting beans, peas and other objects by color at a speed not heretofore attained; to provide an improved conveying means for the objects to be sorted wherein these objects are brought to an inspection point successively and arranged to present the same inspection area of each object to the light control system; to provide improved electro-pneumatic means controlled by the response of the photo-electric cells for deflecting the fall of the objects or not, as required; and to provide other improvements as will hereinafter appear.

In the accompanying drawings, Fig. 1 represents a plan view of a sorting machine embodying one form of the present invention; Fig. 2 represents a section on the line II—II in Fig. 1; Fig. 3 represents a section on the line III—III in Fig. 1, Fig. 4 represents a fragmentary section of an air puffing or blowing mechanism on an enlarged scale.

The discharge tube 1 of a filling tank ends to a zigzag-shaped pipe, the inclined parts 2, 3 of said pipe preferably enclosing angles of 45° with the horizontal plane. In this manner blocking of the passage caused by the pressure of the objects in the tank can be prevented. A sliding valve 4 is arranged in the pipe for regulating the flow of the objects. From the zigzag-shaped pipe the objects to be sorted fall on a vibrating trough 5, inclined at an angle of 6–10° to the horizontal plane. This trough 5 is vibrated by means of an electromagnet connected to the mains with a frequency of 50 cycles per second, the core of said magnet enclosing an angle of substantially 55° with the trough as shown in Fig. 2. The amplitude of the vibrations is made adjustable by means known per se. The vibrating trough 5 ends above an endless, slightly inclined conveyor belt 6 having a V-shaped cross-section with an angle of about 90° between the legs of the V and driven around the rolls 7 and 8 in the direction of the arrow 9 in Fig. 3. This conveyor is driven with such a velocity and has such a length, that the objects to be sorted, e. g. the peas or beans, are arranged in a line with a certain distance between them and are also placed in certain direction, e. g. according to the longitudinal axis of the beans.

With a conveyor length of about 14 inches and a velocity of the conveyor of about 3 feet per second the best results have been obtained. One of the guide rolls 7, 8 can be driven by an electromotor (not shown).

From the discharge end of the conveyor band 6 the objects fall one after the other into a bent fall-tube 10, the upper end of said tube having about the same inclination as the conveyor band 6. The axis of the lower, straight part of this tube preferably is inclined at an angle of substantially 70° to the horizontal plane and extends into the viewing or inspecting chamber 11. In practice the length of the fall-tube 10 is about 13 inches, the inner diameter being about half an inch.

This guiding tube 10 is a very important part of the sorting machine. In known art it has been proposed already to let the articles to be sorted pass in free fall through a viewing area, where they are illuminated, light reflected from the article being picked up by photo-electrical cells that control the sorting means. The articles are brought near the viewing area by means of a V-shaped trough. However, with such means the number of failures in the sorting has been found to increase rapidly when it is tried to increase the number of articles passing the viewing area per time unit, and therefore the capacity of the sorting machine could not surpass a rather low maximum.

In the present sorting machine the end of the V-shaped conveyor 6 is removed from the viewing area, and after leaving this conveyor the articles to be sorted are not allowed to make a free fall, but to the contrary they arrive in the tube 10 having at the entrance part an incline such that the articles pass therethrough with about the same velocity as obtained on the conveyor 6. The incline of the tube 10 gradually increases on the next part of the way and so the influence of gravity is gradually increasing. Then follows the straight part of the tube but still the incline there is such, that a free fall is not obtained but the velocity of the articles is slightly braked by the small friction along the wall of the tube. 10. The end of the tube reaches near to the centre of the area covered by the action of the photo-electric cell, so that practically no distance is left for a free fall of the articles before the light reflected on their surface is picked up by the photo-electric cell.

It has been found that in this way the distances between the articles passing one after the other through the working area of the photo-electric cell can be maintained in a very accurate way so that the capacity of the sorting machine can be increased maintaining a high exactness of sorting.

In the viewing chamber two photo-electric cells 12 and 13 are placed, which are directed onto the screens and color-filters 14, 15 also placed in this chamber. The necessary illumination is obtained by the electric lamps 16. The point of intersection of the axes of the light sensitive cones of the cells 12, 13 lies in the axis of the straight end of the fall-pipe 10, all these three axes lying in one plane. Perpendicularly to said plane and through the point of intersection of said axes, the axis of a blow pipe 17 is directed, through which pipe compressed air is directed against the object to be sorted, when with the aid of the photo-electric cells 12, 13 and the screens 14, 15 an undesired color is found. In this manner the objects of the wrong color are discharged through the gutter 18 and the objects of the right color leave the chamber 11 through the outlet 19. The inclined position of the installation facilitates the separation, so that the duration of the blowing action can be very short.

As shown in Fig. 4, the blow pipe 17 is provided with a valve 20, which can admit compressed air from the air-inlet pipe 22 and the valve chamber 21 into the pipe 17, when the magnet coils 23, 24, which are in parallel with the cores 25, 26, have been energised by means of a current impulse from the photo-electric cells 12, 13, which impulse via a circuit with amplifier known per se, is transmitted to the magnet coils, so that the cores 25, 26 will attract a metal plate 28 fixed onto the valve spindle 27, thereby opening the valve. A spring 29 shuts the valve 20, when the magnet coils are de-energised.

In view of the foregoing description taken in conjunction with the accompanying drawings, it is believed that a clear understanding of the construction, operation and advantages of the machine will be quite apparent to those skilled in this art.

It is to be understood, however, that even though I have herein shown and described a preferred embodiment of my invention that the same is susceptible to certain changes fully comprehended by the spirit of the invention as herein described and within the scope of the appended claims.

Having described the invention, what is claimed as new is:

1. In a color comparison sorting machine, the combination of a V-shaped endless conveyor belt, a vibrating trough for feeding the objects to said belt, a viewing chamber comprising means for illuminating each object when it reaches a viewing point in said chamber, photo-electric means positioned to respond to the light reflected by the object and electropneumatic means controlled by the response of said photo-electric means and positioned to deflect the fall of said object or not as required, and a bent down fall-pipe for the objects between said conveyor belt and said viewing chamber discharging into said viewing chamber.

2. Color comparison sorting machine as claimed in claim 1, wherein the fall-pipe has an entrance portion inclined at about the same angle as the conveyor belt, the inclination of said fall-pipe increasing gradually into a straight part of the pipe discharging into the viewing chamber.

3. A color comparison sorting machine as claimed in claim 2, wherein the straight part of said fall-pipe discharging into the viewing chamber is inclined at an angle of substantially 70° to the horizontal plane.

4. A color comparison sorting machine as claimed in claim 1, wherein the said vibrating trough is inclined at an angle of between 6 and 10° to the horizontal plane and the axis of the vibrations lies in a direction at an angle of substantially 55° with the said trough.

5. A color comparison sorting machine as claimed in claim 1, wherein said electro-pneumatic means controlled by the response of said photo-electric means comprise a blow pipe directed toward the said viewing point.

6. A color comparison sorting machine as claimed in claim 5, wherein said blow pipe is controlled by a valve having a spindle and operated by means of two electromagnets, lying diametrically opposed to the spindle of said valve, said magnets having cores extending in a direction perpendicular to the direction of movement of said valve.

7. A color comparison sorting machine according to claim 1, in which said fall-pipe comprises an entrance end portion substantially in line with the discharge end of said conveyor, a downwardly curving portion and a downwardly inclined discharge end portion extending downwardly substantially to said viewing point.

References Cited in the file of this patent
UNITED STATES PATENTS

| | | |
|---|---|---|
| 1,080,988 | McWilliams | Dec. 9, 1913 |
| 2,617,526 | La Pointe | Nov. 11, 1952 |
| 2,646,880 | Frankel | July 28, 1953 |